United States Patent
Hoogerbrugge et al.

(10) Patent No.: US 9,405,936 B2
(45) Date of Patent: Aug. 2, 2016

(54) CODE INTEGRITY PROTECTION BY COMPUTING TARGET ADDRESSES FROM CHECKSUMS

(71) Applicant: NXP B.V., Eindhoven (NL)

(72) Inventors: Jan Hoogerbrugge, Eindhoven (NL); Wil Michiels, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/572,356

(22) Filed: Dec. 16, 2014

(65) Prior Publication Data

US 2016/0171246 A1 Jun. 16, 2016

(51) Int. Cl.
*G06F 21/00* (2013.01)
*G06F 21/64* (2013.01)
*G06F 9/44* (2006.01)

(52) U.S. Cl.
CPC . *G06F 21/64* (2013.01); *G06F 8/70* (2013.01)

(58) Field of Classification Search
CPC ..................................... G06F 21/64
USPC ........................................ 726/26
See application file for complete search history.

(56) References Cited

U.S. PATENT DOCUMENTS

| 5,778,394 A * | 7/1998 | Galtzur ............... G06F 11/1451 707/999.1 |
| 8,645,991 B2 * | 2/2014 | McIntire ............ H04N 7/17318 725/34 |
| 9,177,153 B1 * | 11/2015 | Perrig ................... G06F 21/577 |
| 2013/0232323 A1 | 9/2013 | Lerouge et al. |

FOREIGN PATENT DOCUMENTS

WO   WO2009/144606 A1   12/2009

OTHER PUBLICATIONS

Atallah, "A Survey of Anti-Tamper Technologies", Crosstalk, The Journal of Defense Software Engineering, Nov. 2004, pp. 12-16.
Chang, et al., "Protecting Software Codes by Guards", CERIAS Tech Report 2001-49, Purdue University, Center for Education and Research in Information Assurance and Security *Arxan Technologies, 14 pages.
International Extended Search Report for International application 15193911.3 dated May 18, 2016.

* cited by examiner

*Primary Examiner* — Longbit Chai

(57) ABSTRACT

A method of obscuring software code including a plurality of basic blocks, including: calculating, by a processor, a checksum value of the current basic block and a pointer to the end of the current basic block; determining a preceding basic block for the current basic block; inserting the checksum value for the current basic block into the preceding basic block; and inserting instructions into the preceding basic block to determine a pointer to the beginning of the current basic block based upon the checksum value of the current basic block.

25 Claims, 2 Drawing Sheets

CODE INTEGRITY PROTECTION BY COMPUTING TARGET ADDRESSES FROM CHECKSUMS

RELATED APPLICATION

The present application is related to U.S. patent application Ser. No. 14/259,395, entitled "CONTROL FLOW FLATTENING FOR CODE OBFUSCATION WHERE THE NEXT BLOCK CALCULATION NEEDS RUN-TIME INFORMATION" to Hoogerbrugge et al. (hereinafter "Hoogerbrugge"), which is hereby incorporated by reference for all purposes as if fully set forth herein.

TECHNICAL FIELD

Various exemplary embodiments disclosed herein relate generally to control flow flattening for code obfuscation where the next block calculation needs run-time information.

BACKGROUND

Today software applications are widely used to provide various services to users. These software applications may be hosted on a variety of different devices, such as for example, mobile phones, personal computers, laptop computers, tablets, set top boxes, etc. Software applications are found in many systems in use by consumers or in industrial systems. Software applications are also found in smart cards and credit cards. Further, software applications may be implemented across networks such as the internet, where the software application runs on servers, and is accessed using various user devices. Many of these software applications require the use of security protocols to protect content, information, transactions, and privacy. Many software applications are run in environments where an attacker has complete control of the operation of the software application, and an attacker may attempt to reverse engineer the code of the software application in order to gain access to secure information or to even understand the operation of the software in order to reproduce or modify the functionality of the software application. An attacker may use various reverse engineering tools, such as for example, code analyzers and debuggers, to obtain information related to the software application. Accordingly, techniques have been developed to in order to make it hard for an attacker to reverse engineer software. One way to make reverse engineering of the code more difficult is code obfuscation. Code obfuscation seeks to create obfuscated code that is difficult for humans to understand. Code obfuscation may be used to conceal a software application's purpose or its logic, so as to prevent tampering or reverse engineering of the software application.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of obscuring software code including a plurality of basic blocks, including: calculating, by a processor, a checksum value of the current basic block and a pointer to the end of the current basic block; determining a preceding basic block for the current basic block; inserting the checksum value for the current basic block into the preceding basic block; and inserting instructions into the preceding basic block to determine a pointer to the beginning of the current basic block based upon the checksum value of the current basic block.

Various embodiments are described wherein a non-transitory machine-readable storage medium encoded with instructions of a current basic block of software code for execution by a processor, the non-transitory machine-readable storage medium including: instructions for initializing a checksum value for the next basic block; instructions for setting a pointer to the end of the next basic block; instructions for determining the beginning of the next basic block.

Various embodiments are described further including a method to check the integrity of software code for execution by a processor, including: initializing a checksum value for the next basic block; setting a pointer to the end of the next basic block; determining the beginning of the next basic block.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
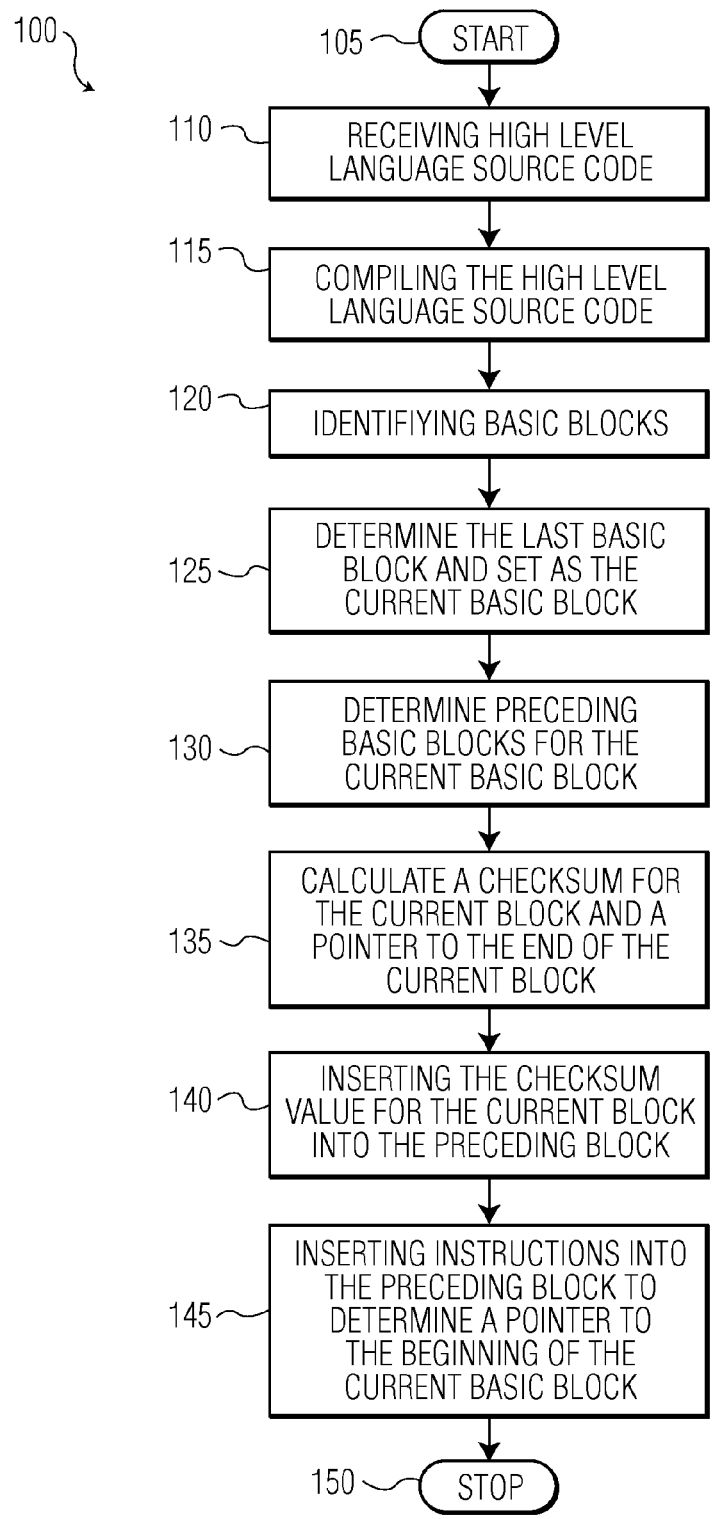
FIG. 1 illustrates a method of obscuring software code.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A software application may be implemented using a plurality of basic blocks. The plurality of basic blocks are interconnected, in the sense that some of the blocks build on the processed data of one or more of the predecessor blocks. For example, a basic block may use a plurality of computer instructions, including arithmetical instructions, which together implement the functionality of the basic block. A basic block is a portion of code within the software application with only one entry point and only one exit point. A basic block has a first instruction, and when the first instruction is executed, the rest of the instructions in the basic block are necessarily executed exactly once in order. Code obfuscation may be used to implement the software application. The basic blocks to which control may transfer after reaching the end of a basic block are called the basic block's successors. The basic blocks from which control may have come when entering a basic block are called the basic block's predecessors. Further, code obfuscation may be used with other methods of implementing a software application such as lookup tables or finite state machines in order to prevent attacks on the software application.

The network of basic blocks are arranged to perform the functions of the software application. The software application may receive input information that is operated upon by the software application. The software application will have a first basic block to start the software application that then proceeds to the next basic block. A number of further basic blocks may next be executed. The execution of the basic blocks may include passing data from one basic block to another. In this manner a network of basic blocks emerges which collectively performs the function of the software application.

In many situations software applications have to be protected against attackers that attempt to reverse engineer the code, such as in the examples mentioned above. Attackers may use sophisticated tools to analyze software in binary form to understand what the software is doing and how the software works. One effective and known technique to counter such analysis is control flow flattening where all structure from the control flow graph of a function is removed. Every basic block may end with a small computation that determines the next basic block to be executed. This technique is described in "Surreptitious Software—Obfuscation, Watermarking, and Tamperproofing for Software Protection", Christian Collberg, Jasvir Nagra, Addison-Wesley Software Security Series, Editor: Gary McGraw, 792 pages, ISBN: 0-321-54925-2, August 2009. Accordingly, it is desirable to make this computation such that a reverse engineering tool cannot determine from the code in a basic block which successor basic blocks it may have. Other techniques are known where the computation of the successor basic block needs information that is not available in the current basic block. Such a technique is described in "An overview of control flow graph flattening", Jan Cappaert and Bart Preneel, K. U. Leuven/ESAT/SCD-COSIC, re-trust.dit.unitn.it/files/20081015Doc/session2-1Cappaert.pdf.

Another well known method to prevent tampering is to compute checksums on the binary code of the application during execution of the application. If code has been changed, then the computed checksum value will be different and the application may then stop or change its behavior based upon the incorrect checksum. A problem with existing checksum approaches is that the checksum calculations can be detected in the code, and the check on the result that follows it may be removed. This may be automated so that it becomes feasible to remove thousands of checks of checksums from an application.

To solve this problem embodiments are described that combine code integrity protection with control flow flattening. After control flow flattening, every basic block ends with a small computation that determines the start address of the next basic block to execute. The embodiments described below include performing a checksum computation on the code to check the integrity of the next basic block. If the checksum calculation is wrong due to tampering of the code, then the computed start address of the next basic block will be incorrect. The result is that the program will not behave as intended and will compute incorrect results and very likely will crash. The checksum computation may start with an initial value that needs to be adjusted if one would like to tamper the next basic block. This initial value may be embedded in the code of the current basic block. If an attacker attempts to adjust it, then the checksum of the current basic block would become different. Accordingly, in order to adjust for this, the attacker would also need to adjust the previous basic block, and so on.

By checking the integrity of a next basic block immediately before executing the next basic block, the time between checking and executing the code is very short, which reduces the opportunities for an attacker to modify the code in this short time window.

Hoogerbrugge describes control flow flattening to obfuscate the structure of binary code. This transformation results in basic blocks like:

$I_1$

. . .

$I_n$ next_bb= . . .

next_addr=start [next_bb]

jump next_addr

Where $I_1 \ldots I_n$ are instructions and start is a table with starting addresses of basic blocks. The code executes the instructions $I_1 \ldots I_n$ from the original application code followed by code that determines or computes the next basic block next_bb to execute. The value next_bb may be an index into the table start to determine address next_addr of the next basic block to be executed. Then the application code executes a jump to the address next_addr.

Next, an embodiment will be described that checks the integrity of the next basic block before jumping to it. This may done as follows:

```
I_1
. . .
I_n
next_bb = . . .
ptr = end[next_bb]       // ptr = end address of next basic block
cs = 0x5314de67          // current checksum = initial checksum
do
    ptr = ptr – 4        // decrement pointer
    cs = cs xor *ptr     // update current checksum value
while cs != 0            // loop until current checksum becomes zero
jump ptr                 // jump to next basic block
```

In this embodiment the table end does not contain start addresses of basic blocks, but instead contains end addresses of basic blocks or an address close to the end of the basic blocks. Values from this table may be used to initialize a pointer called ptr that may be used for the checksum computation. So after next_bb is calculated, the pointer ptr is initialized using the value from the table end corresponding to next_bb. Next, the checksum value cs may be initialized, for example, with an initial value 0x5314de67. Next a loop starts. After entering the loop, ptr is decremented and the checksum cs is updated with the value in memory to which ptr is pointing. This loop repeats until the checksum value cs becomes zero, and at this moment, ptr should point to the starting address of the next basic block to be executed.

In this example, the checksum computation includes XORing all of the 4 byte words in the basic block. Other methods to compute a checksum are applicable as well. For example, the checksum can be made address dependent by incorporating ptr into the checksum calculation. This may prevent modifications where an attacker reorders instructions that would remain undetected when the checksum consists of only XORing the instructions.

The initial checksum should correspond with the checksum over the target basic block. If this is that case then cs becomes zero at the right moment, i.e., the pointer ptr is pointing to the beginning of the target basic block. Because the initial checksum is embedded in the code of the current basic block, when the embedded initial checksum value is modified, the checksum computations that check the current basic block will fail. By embedding checksum values in code that is checked as well, chains of checks are created that all need to be removed in order to make a single modification to the code.

In certain situations, the value of cs may become zero before ptr reaches the start address of the next basic block even though an attacker has not tampered with the code. A compiler that implements this described protection method may detect this and modify the code of the basic block to prevent this from occurring.

In the example basic block discussed above, it is assumed that this basic block has a single successor basic block. In the case of two successor basic blocks (basic blocks originating from conditional jumps), then two initial checksums are embedded in the basic block and the right one has to be selected based on the condition of the conditional jump. Further, the correct pointer to the end of the next basic block is selected based upon the condition. The selected checksum value and pointer may then be used as described above to determine the pointer value to the beginning of the next block.

One method to circumvent the protection is to replace the checksum loop by a loop that decrement ptr until it points to an indirect branch and then jump to the next instruction, because control flow flattening results in every basic block ending with an indirect jump. A simple countermeasure is to insert "junk code" between successive basic blocks in memory. Then if an attacker attempts to find the beginning of the next basic block by searching backward to an indirect jump, then the attacker would jump to the junk code instead of the start of a basic block. This would cause the code to malfunction and defeat the attacker.

In the embodiments described above, the first basic block of function remains unchecked. However, it is straightforward to extend the embodiment so that the first basic block of a function is checked by the caller of the function. By this extension, the check chains extend through the whole application.

The embodiments described herein may be implemented in a complier that compiles a higher order language into machine code for execution on a processor. Also, the embodiments may be applied to existing machine code to obscure the operation of that machine code.

FIG. 1 illustrates a method of obscuring software code. The method 100 may begin at 105. Next, the method may receive high level language source code 110. Then the method 100 may compile the high level language source code 115. Next, the method 100 may identify basic blocks in the compiled code 120. Then the method 100 may determine the last basic block 125 set the current block to be the last block. Next, the method 100 may determine the preceding basic blocks for the current basic block 130. The method 100 then calculates a checksum for the current block and a pointer to the end of the current block 135. Next, the method 100 inserts the calculated checksum value for the current block into the preceding blocks 140. The method 100 then inserts instructions into the preceding block to determine a pointer to the beginning of the current basic block 145. The method 100 then ends at 150.

Figure 2:
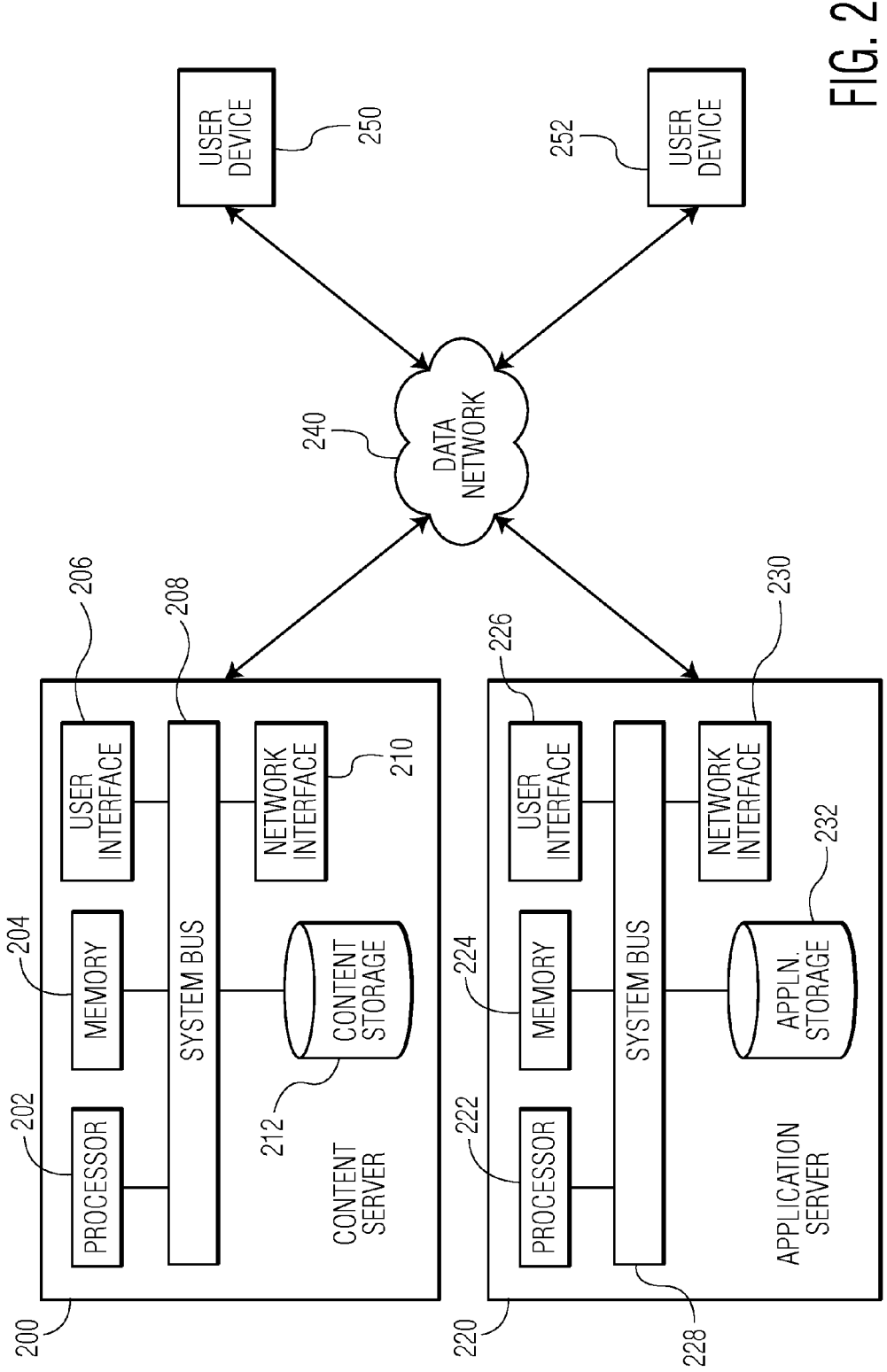
FIG. 2 illustrates a system for providing a user device secure content and a software application that processes the secure content.

FIG. 2 illustrates a system for providing a user device secure content and a software application that processes the secure content. The system includes a content server 200, application server 220, user devices 250, 252, and a data network 240. The user devices 250, 252 may request access to secure content provided by the content server 200 via data network 240. The data network can be any data network providing connectivity between the user devices 250, 252 and the content server 200 and application server 220. The user devices 250, 252 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 200. The software application may be downloaded from the application server 220. The software application may be obscured using the techniques described above as well as operate as described above. Once the user devices 250, 252 install the software application, the user device may then download secure content from the content server 200 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 200 may control the access to the secure content provided to the user devices 250, 252. As a result when the content server 200 receives a request for secure content, the content server 200 may transmit the secure content to the requesting user device. Likewise, the application server 220 may control access to the software application provided to the user devices 250, 252. As a result when the content server 220 receives a request for the software application, the application server 220 may transmit the software application to the requesting user device. A user device requesting the software application or secure content may also be authenticated by the respective servers, before providing the software application or secure content to the user device.

The content server 200 may include a processor 202, memory 204, user interface 206, network interface 210, and content storage 212 interconnected via one or more system buses 208. It will be understood that FIG. 2 constitutes, in some respects, an abstraction and that the actual organization of the components of the device 200 may be more complex than illustrated.

The processor 202 may be any hardware device capable of executing instructions stored in memory 204 or storage 212. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 202 may include static random access memory (SRAM), dynamic RAM (DRAM), flash memory, read only memory (ROM), or other similar memory devices.

The user interface 206 may include one or more devices for enabling communication with a user such as an administrator. For example, the user interface 206 may include a display, a mouse, and a keyboard for receiving user commands.

The network interface 210 may include one or more devices for enabling communication with other hardware devices. For example, the network interface 210 may include a network interface card (NIC) configured to communicate according to the Ethernet protocol. Additionally, the network interface 210 may implement a TCP/IP stack for communication according to the TCP/IP protocols. Various alternative or additional hardware or configurations for the network interface 210 will be apparent.

The content storage 212 may include one or more machine-readable content storage media such as read-only memory (ROM), random-access memory (RAM), magnetic disk storage media, optical storage media, flash-memory devices, or similar storage media. In various embodiments, the content storage 212 may store content to be provided to users.

The application server 220 includes elements like those in the content server 200 and the description of the like elements in the content server 200 apply to the application server 220. Also, the content storage 212 is replaced by application storage 232. Further, it is noted that the content server and applications server may be implemented on a single server. Also, such servers may be implemented on distributed computer systems as well as on cloud computer systems.

A method according to the embodiments of the invention may be implemented on a computer system as a computer implemented method. Executable code for a method according to the invention may be stored on a computer program medium. Examples of computer program media include memory devices, optical storage devices, integrated circuits, servers, online software, etc. Such a computer system, may also include other hardware elements including storage, network interface for transmission of data with external systems as well as among elements of the computer system.

In an embodiment of the invention, the computer program may include computer program code adapted to perform all the steps of a method according to the invention when the computer program is run on a computer. Preferably, the computer program is embodied on a non-transitory computer readable medium.

A method of creating the obscured code of a white-box implementation according to the invention may be implemented on a computer as a computer implemented method. Executable code for a method according to the embodiments may be stored on a computer program medium. In such a method, the computer program may include computer program code adapted to perform all the steps of the method when the computer program is run on a computer. The computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of obscuring software code of a current basic block of a plurality of basic blocks, comprising:
    calculating, by a processor device, a checksum value of the current basic block of the software code and a pointer to the end of the current basic block;
    determining a preceding basic block for the current basic block;
    inserting the checksum value for the current basic block into the preceding basic block; and
    inserting instructions into the preceding basic block to determine a pointer to the beginning of the current basic block based upon the checksum value of the current basic block.

2. The method of claim 1, further comprising:
    inserting instructions into the preceding basic block for determining a last basic block; and
    inserting instructions into the preceding basic block for setting the current basic block as the last basic block.

3. The method of claim 1, further comprising inserting instructions for setting the current block to the preceding block.

4. The method of claim 3, further comprising repeating the steps of calculating the checksum value of the current basic block, determining the preceding basic block, inserting the checksum value, inserting instructions into the preceding basic block, and setting the current block to the preceding block until a first basic block is reached.

5. The method of claim 4, further comprising calculating a checksum value of the current basic block and a pointer to the end of the first basic block and providing the checksum value of the first block and pointer to end of the first block to an application that calls the first basic block.

6. The method of claim 1, further comprising inserting junk code between the current basic block and the preceding basic block.

7. The method of claim 1, wherein instructions to determine a pointer to the beginning of the current basic block further includes repeatedly calculating a checksum of the current basic block and decrementing a pointer to the current basic block until the calculated checksum value equals a previously calculated checksum value for the current basic block, wherein an initial value of the pointer is to the end of the current basic block.

8. The method of claim 7, further comprising determining the calculated checksum value prematurely equals the previously calculated checksum value for the current basic block.

9. The method of claim 8, further comprising when the calculated checksum value prematurely equals the previously calculated checksum, modifying the code of the current basic block to prevent the calculated checksum value from prematurely equaling the previously calculated checksum.

10. The method of claim 7, wherein calculating the checksum of the current basic block is based upon the value of the pointer.

11. A non-transitory machine-readable storage medium encoded with instructions for checking integrity of a basic block next to a current basic block of software code of a plurality of basic blocks for execution by a processor device, the non-transitory machine-readable storage medium comprising:
    instructions for calculating a checksum value for the next basic block in the processor device;
    instructions for setting a pointer to the end of the next basic block and inserting the checksum into the current basic block;

instructions for determining the beginning of the next basic block using the pointer and the checksum value.

12. The non-transitory machine-readable storage medium of claim 11 wherein determining the beginning of the next basic block includes decrementing the pointer based upon an iterative validation of the checksum of the next basic block to determine the beginning of the next basic block.

13. The non-transitory machine-readable storage medium of claim 12, wherein the iterative validation of the checksum is based upon the value of the pointer.

14. The non-transitory machine-readable storage medium of claim 12, wherein initializing a checksum value for the next basic block includes using an embedded checksum value for the next basic block.

15. The non-transitory machine-readable storage medium of claim 11 further comprising:
   instructions for a preceding basic block that precedes a current basic block comprising:
   instructions for initializing a checksum value for the current basic block;
   instructions for setting a pointer to the end of the current basic block; and
   instructions for determining the beginning of the current basic block.

16. The non-transitory machine-readable storage medium of claim 11, further comprising instructions for setting the current block to the preceding block.

17. The non-transitory machine-readable storage medium of claim 11, further comprising instructions for junk code between the current basic block and the next basic block.

18. The non-transitory machine-readable storage medium of claim 11, further comprising instructions for determining the next basic block based upon a condition wherein:
   initializing a checksum value for the next basic block depends upon the condition; and
   setting a pointer to the end of the next basic block depends upon the condition.

19. A method to check the integrity of a basic block next to a current basic block of software code of a plurality of basic blocks for execution by a processor device, comprising:
   calculating a checksum value for the next basic block in the processor device;
   setting a pointer to the end of the next basic block and inserting the checksum into the current basic block; and
   determining the beginning of the next basic block using the pointer and the checksum value.

20. The method of claim 19, wherein determining the beginning of the next basic block includes decrementing the pointer based upon an iterative validation of the checksum of the next basic block to determine the beginning of the next basic block.

21. The method of claim 20, wherein the iterative validation of the checksum is based upon the value of the pointer.

22. The method of claim 20, wherein initializing a checksum value for the next basic block includes using an embedded checksum value for the next basic block.

23. The method of claim 19, further comprising:
   for a preceding basic block that precedes the current basic block comprising:
   initializing a checksum value for the current basic block;
   setting a pointer to the end of the current basic block; and
   determining the beginning of the current basic block.

24. The method of claim 19, further comprising setting the current block to the preceding block.

25. The method of claim 19, further comprising determining the next basic block based upon a condition wherein:
   initializing a checksum value for the next basic block depends upon the condition; and
   setting a pointer to the end of the next basic block depends upon the condition.

* * * * *